INVENTOR.
ROBERT L. STONE
BY
H. G. Manning
ATTORNEY

May 5, 1953 R. L. STONE 2,637,557

OPTICAL LOG SYSTEM

Filed Feb. 21, 1948 2 SHEETS—SHEET 2

INVENTOR.
ROBERT L. STONE
BY
H. G. Manning
ATTORNEY

Patented May 5, 1953

2,637,557

UNITED STATES PATENT OFFICE 2,637,557

OPTICAL LOG SYSTEM

Robert L. Stone, Lake Worth, Fla., assignor to The Soundscriber Corporation, New Haven, Conn., a corporation of Connecticut Application February 21, 1948, Serial No. 10,107

1 Claim. (Cl. 274—1)

This invention relates to sound recording and reproducing apparatus, and more particularly to a device for visually indicating the position of a phonograph stylus with respect to a sound record.

One object of this invention is to provide an apparatus of the above nature which includes a fixed lamp for throwing a beam of light upon a movable wire mounted on the stylus-carrying arm so as to cast a shadow upon a fixed transparent scale at the front of the phonograph cabinet in order to indicate the position of the stylus with respect to the grooves of a disk record.

Another object is to provide a device of the above nature which includes means for adjusting the position of the shadow wire with relation to the stylus.

Another object is to provide a device of the above nature which includes means confining the beam of light to the zone of the scale.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

Figure 1:
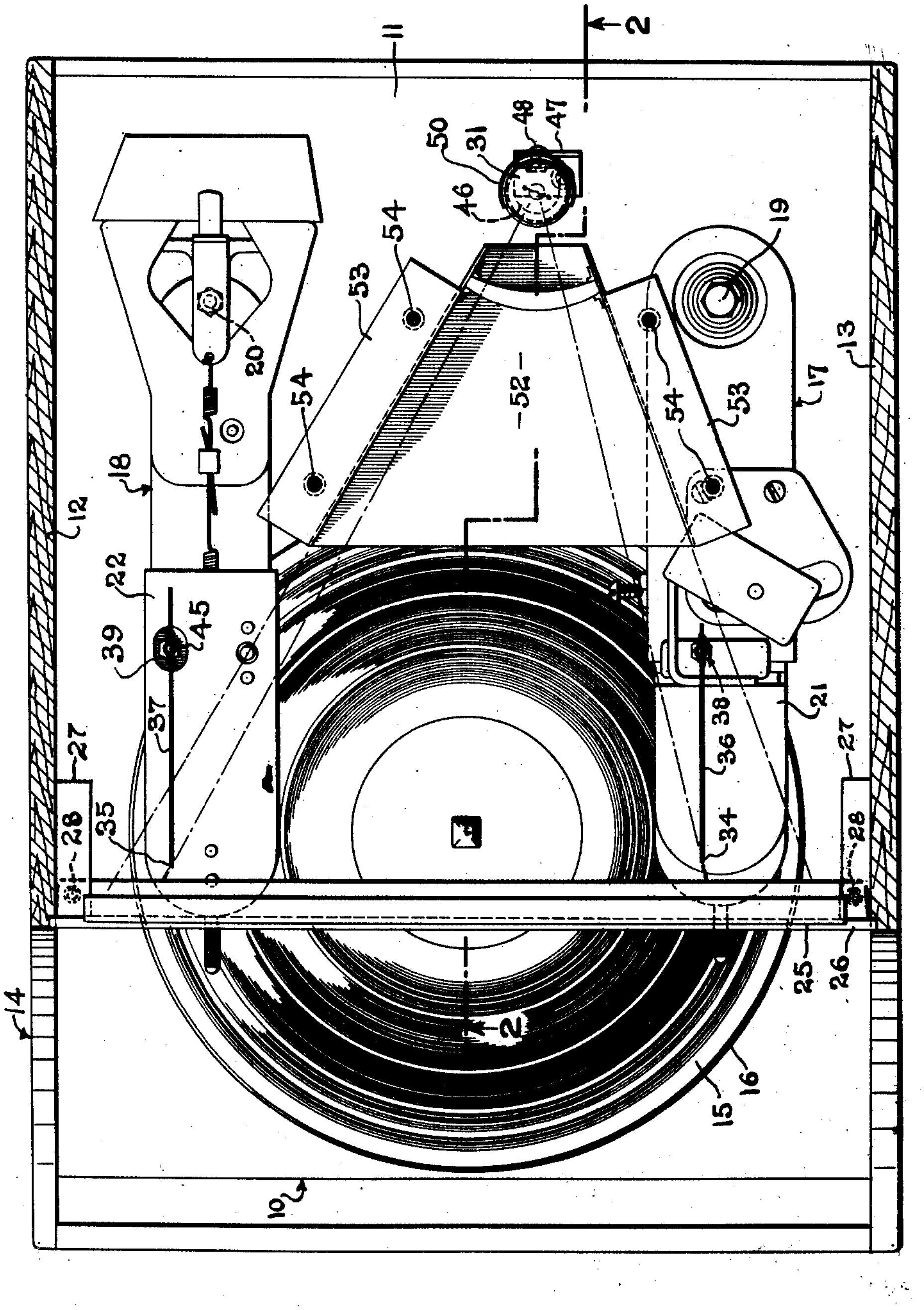
Fig. 1 is a plan view of the optical log system embodied in a dictating machine, the cabinet of the machine being shown in section as indicated by the line 1—1 of Fig. 2.

Referring now to the drawings in which like reference numerals denote corresponding parts throughout the several views, the numeral 10 indicates generally a dictating machine chassis having a rectangular top plate 11 which is supported between vertical side walls 12, 13 of a cabinet 14.

Figure 2:
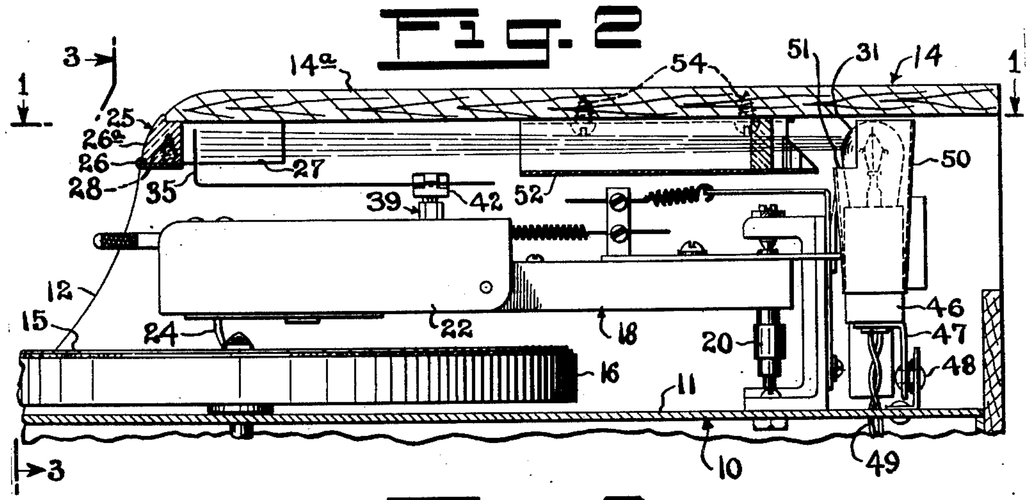
Fig. 2 is a cross sectional view taken on the line 2—2 of Fig. 1.
Figure 3:
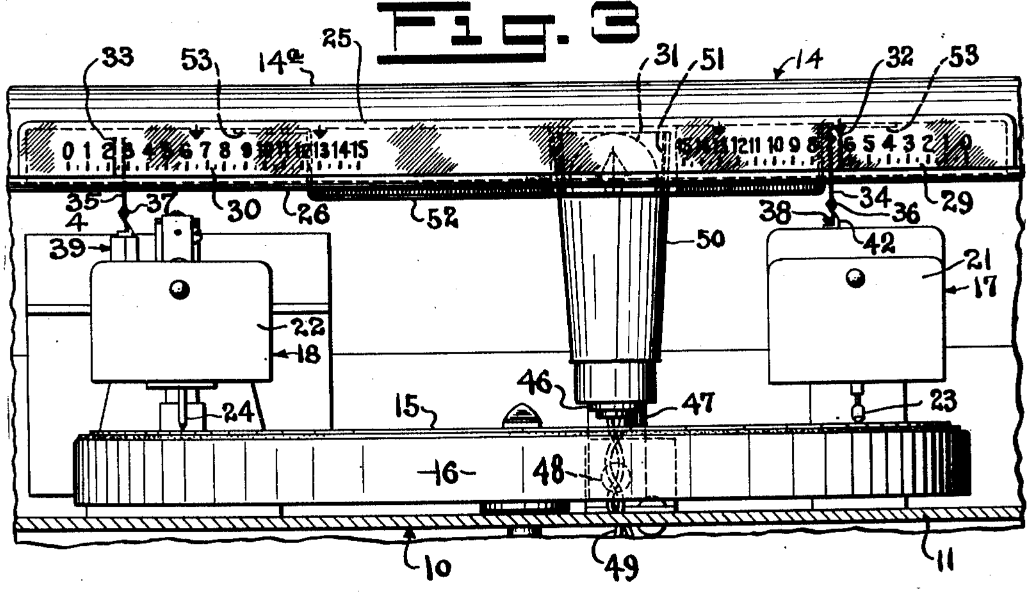
Fig. 3 is a front view on an enlarged scale, taken on the line 3—3 of Fig. 2.

As will be seen in Figs. 2 and 3, the side walls 12, 13 extend above the top plate 11 of the chassis in order to support a top cabinet wall 14*a*. A disk record 15 is adapted to be supported over the front portion of the top plate 11 by means of a horizontal turntable 16.

A pair of phonographic devices, such as a recording arm 17 and a playback arm 18, are swingably supported over opposite side portions of the top plate 11 and the turntable 16 by means of pivots 19, 20 located respectively, at the rear ends of the arms 17, 18. The front ends of said arms are provided respectively with a recording head 21 and a reproducing head 22, which have a recording stylus 23 and a playback stylus 24, which are adapted to operate in the usual spiral groove in the surface of the disk record 15.

In order to simultaneously give visual indications of the positions of the styli of the recording arm 17 and the playback arm 18 with respect to the grooves of the disk record 15, provision is made of an elongated transparent scale member 25 which is held in a horizontal position against the underside of the front edge of the top cabinet wall 14*a* by means of a support bar 26. The scale member 25 preferably is rabbeted at its upper rear corner and its lower front corner, so as to interengage with the edges of the top wall 14*a* and the bar 26, and has a convex front surface 26*a* (Fig. 2) to produce a magnifying effect upon the scale indications which are marked at the rear surface thereof.

The support bar 26 is secured as by screws 28 to blocks 27 (Fig. 2) mounted upon the cabinet side walls 12, 13.

The rear surface of the scale member 25 is flat and preferably frosted, and has two sets of inwardly increasing scale graduations 29, 30 applied thereto. The scale graduations consist of the numerals 1–15 arranged in reversed order, as shown in Fig. 3. The scale member 25 will be illuminated by means of a fixed electric lamp 31 mounted upon a rear portion of the top plate 11, and shadows 32 and 33 will be thrown upon the scale member 25 by means of upturned vertical ends 34, 35 of a pair of L-shaped shadow wires 36, 37, respectively.

Figure 4:
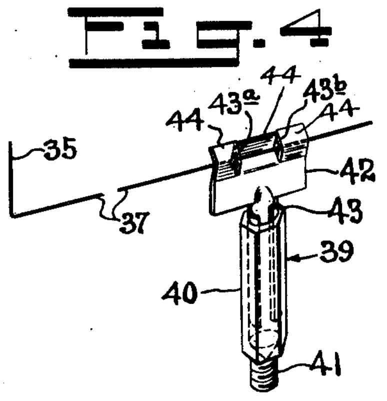
Fig. 4 is a perspective view of one of the shadow wires and its support.

The shadow wires 36, 37 are held in forwardly-extending positions on the recording arm 17 and the playback arm 18, respectively, by means of supports 38, 39, each of which comprises a hollow hexagonal support stud 40 (Fig. 4) having a reduced threaded lower end 41, and a T-shaped upper clip 42 preferably formed from sheet metal. The stem of the clip 42 is curved in cross section, thereby providing a resilient compressible semi-tubular pivot 43 adapted to be held frictionally against turning within the hollow stud 40. The head of the T-shaped clip 42 has a pair of vertical slits 43*a*, 43*b* forming three staggered angular spring fingers 44 between which one of the shadow wires 36, 37 is frictionally held.

It will be noted that the reproducing head 22 is formed on its upper face with an aperture 45 which permits the shadow wire support 39 to be attached by means of its threaded end 41 directly to the playback arm 18, but inasmuch as the recording head 21 is shorter than the reproducing head 22, the wire support 38 will be secured to the recording arm 17 without requiring any such aperture in the recording head.

The electric lamp 31 is mounted in a socket 46, which is carried on the top plate 11 by means of an angular bracket 47 having a horizontal friction pivot 48. The socket 46 is provided with a pair of insulated conductor wires 49, which are connected to any suitable source of current for the lamp 31.

In order to prevent the escape of stray beams of light from the lamp 31, provision is made of a reflecting shield 50 preferably semi-conical in shape, which embraces the lamp 31 and has a notch 51 at its upper front edge, so that a beam of light from the lamp will illuminate the scale member 25.

Provision is also made of a substantially triangular light baffle 52, which will restrict the light to the zone of the scale member 25. The baffle 52 is U-shaped in cross-section and has outstanding horizontal flanges 53 at its upper edges, which are secured to the undersurface of the top cabinet wall 14a by means of screws 54.

*Operation*

As a preliminary step to placing the dictating machine into operation, the shadow wires 36, 37 will first be adjusted to give the same indications upon the two sets of graduations 29, 30, when both of the styli 23, 24 are in the same groove of the disk record 15.

The lamp 31 will then be lighted, and the wires 36, 37 swung horizontally by turning the clips 42 in the studs 40 so that the shadows 32, 33 will fall upon the zero marks of the respective graduated scales 25.

The frictional engagement of the pivot 43 in the stud 40 will permit each of the shadow wires 36, 37 to be adjusted laterally, and will hold the wires firmly in position when the adjustment has been completed.

The spring fingers 44 of the clip 42 will permit the shadow wires to be adjusted longitudinally toward or away from the scale members 25, and also will permit the wires to be twisted so that the upturned ends 34, 35 may be swung to cause the shadows 32, 33 of the vertical ends 34, 35 to have the proper sharp definition. The machine may then be used in the normal manner and the exact positions of the styli 23, 24 will be accurately shown by the shadows 32, 33 upon the scale member 25.

One advantage of the present invention is that the reflecting shield 50 will throw the light from the lamp 31 forwardly and will also operate in conjunction with the baffle 52 to prevent the escape of unwanted light.

A further advantage is that when it eventually becomes necessary to replace the electric lamp 31 with a new one, the socket 46 may be swung downwardly about the pivot 48 so that free lateral access to the lamp may be had through the rear of the cabinet.

Another advantage of the improved log system herein disclosed is that it requires no parts which would obstruct manipulation of the recording and reproducing heads or the replacement of the record disk upon the turntable.

Another advantage is that all of the parts of the log system are located in protected locations where they cannot accidentally be thrown out of adjustment during normal use of the machine.

Another advantage is that the illumination of the scale may be made strong enough so that it will not only produce a clearly defined distinct shadow as an indication upon the scale but it will also illuminate the entire width of the scale member at all times.

Another advantage is that the invention will avoid the disturbing effects of parallax, which is always present when a pointer or other element is employed to give an indication upon a scale, due to the location of the pointer and the scale in different planes. In applicant's device, the indicating element is a shadow upon the scale itself, so that parallax and the attendant inaccuracy will be completely avoided.

While there has been disclosed in this specification one form in which the invention is to be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a sound recording and reproducing apparatus, a cabinet, a turntable for supporting a flat circular disk record to rotate above said cabinet, a driven recording arm and a free moving playback arm pivotally mounted on vertical shafts secured to said cabinet to swing across said record at opposite sides of the center thereof, a stylus-carrying head flexibly secured to said recording arm, a stylus carrying head flexibly secured to said playback arm, each of said heads carrying an upstanding vertical pointer, a light-transmitting elongated scale located at the front of said cabinet closely adjacent the paths of each of said pointers, a single lamp at the rear of said cabinet for illuminating both ends of said scale for causing said pointers to cast two sharp shadows with substantially no parallax on the opposite ends of said scale for indicating simultaneously the distances which both of said styluses have travelled inwardly from the periphery of said record, a reflecting shield embracing the rear of said lamp, and a triangular baffle located between said lamp and said heads and above said record to prevent the light emitted by said lamp from shining on the surface of said record.

ROBERT L. STONE.

References Cited in the file of this patent

UNITED STATES PATENTS

| Number | Name | Date |
|---|---|---|
| 1,011,285 | Verplast | Dec. 12, 1911 |
| 1,893,421 | Latzko et al. | Jan. 3, 1933 |
| 2,138,875 | Miessner | Dec. 6, 1938 |
| 2,141,804 | Thompson et al. | Dec. 27, 1938 |
| 2,231,938 | Miessner | Feb. 18, 1941 |
| 2,245,970 | Frantz | June 17, 1941 |
| 2,464,064 | Thompson | Mar. 8, 1949 |

FOREIGN PATENTS

| Number | Country | Date |
|---|---|---|
| 15,861 | Great Britain | Nov. 28, 1912 |
| 464,444 | Great Britain | Apr. 19, 1937 |